(12) United States Patent
Sayres et al.

(10) Patent No.: US 8,233,763 B2
(45) Date of Patent: Jul. 31, 2012

(54) FLEXIBLE COVER FOR CABLE TROUGH SYSTEM

(75) Inventors: Derek Sayres, Lonsdale, MN (US); David E. Rapp, Eden Prairie, MN (US); Glen Cordle, St. Louis Park, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 452 days.

(21) Appl. No.: 12/327,637

(22) Filed: Dec. 3, 2008

(65) Prior Publication Data

US 2009/0169164 A1   Jul. 2, 2009

Related U.S. Application Data

(60) Provisional application No. 61/012,328, filed on Dec. 7, 2007, provisional application No. 61/073,268, filed on Jun. 17, 2008.

(51) Int. Cl.
*G02B 6/00* (2006.01)
*H01B 7/00* (2006.01)
*H02G 3/00* (2006.01)

(52) U.S. Cl. ......... 385/135; 385/134; 174/66; 174/72 R; 174/101; 174/135

(58) Field of Classification Search .................. 385/134, 385/135; 174/101, 135, 66, 72 R
See application file for complete search history.

(56) References Cited

U.S. PATENT DOCUMENTS

| | | | |
|---|---|---|---|
| 3,351,699 A | 11/1967 | Merckle | |
| 5,067,678 A | 11/1991 | Henneberger et al. | |
| 5,316,243 A | 5/1994 | Henneberger | |
| 5,752,781 A | 5/1998 | Haataja et al. | |
| 6,107,576 A * | 8/2000 | Morton et al. | 174/101 |
| 6,631,875 B1 | 10/2003 | Kampf et al. | |
| 6,715,719 B2 | 4/2004 | Nault et al. | |
| 6,739,795 B1 | 5/2004 | Haataja et al. | |
| 6,810,191 B2 | 10/2004 | Ferris et al. | |
| 6,835,891 B1 | 12/2004 | Herzog et al. | |
| 6,916,986 B1 | 7/2005 | Herzog et al. | |
| 7,041,897 B2 | 5/2006 | Herzog | |
| 2002/0125028 A1 * | 9/2002 | Jadaud et al. | 174/48 |
| 2003/0066936 A1 * | 4/2003 | Beck et al. | 248/49 |

FOREIGN PATENT DOCUMENTS

| | | |
|---|---|---|
| EP | 1 229 623 A1 | 8/2002 |
| EP | 1 229 624 A1 | 8/2002 |

OTHER PUBLICATIONS

FiberGuide® Fiber Management Systems, *ADC Telecommunications, Inc.*, pp. 1-34 (Jun. 1998).
U.S. Appl. No. 12/327,260, filed Dec. 3, 2008 entitled "Telescoping Cover for Cable Trough System" Inventors: Lindquist et al.
International Search Report and Written Opinion mailed Mar. 13, 2009.

* cited by examiner

*Primary Examiner* — Ryan Lepisto
(74) *Attorney, Agent, or Firm* — Merchant & Gould P.C.

(57) ABSTRACT

Systems and methods for covering a trough member. A cover system can include a flexible cover coupled to a side wall of the trough member. The flexible cover is selectively removable from the side wall to allow access to an interior of the trough member. The flexible cover mounts with a snap arrangement. Support ribs are mounted to side walls of the trough member.

11 Claims, 21 Drawing Sheets

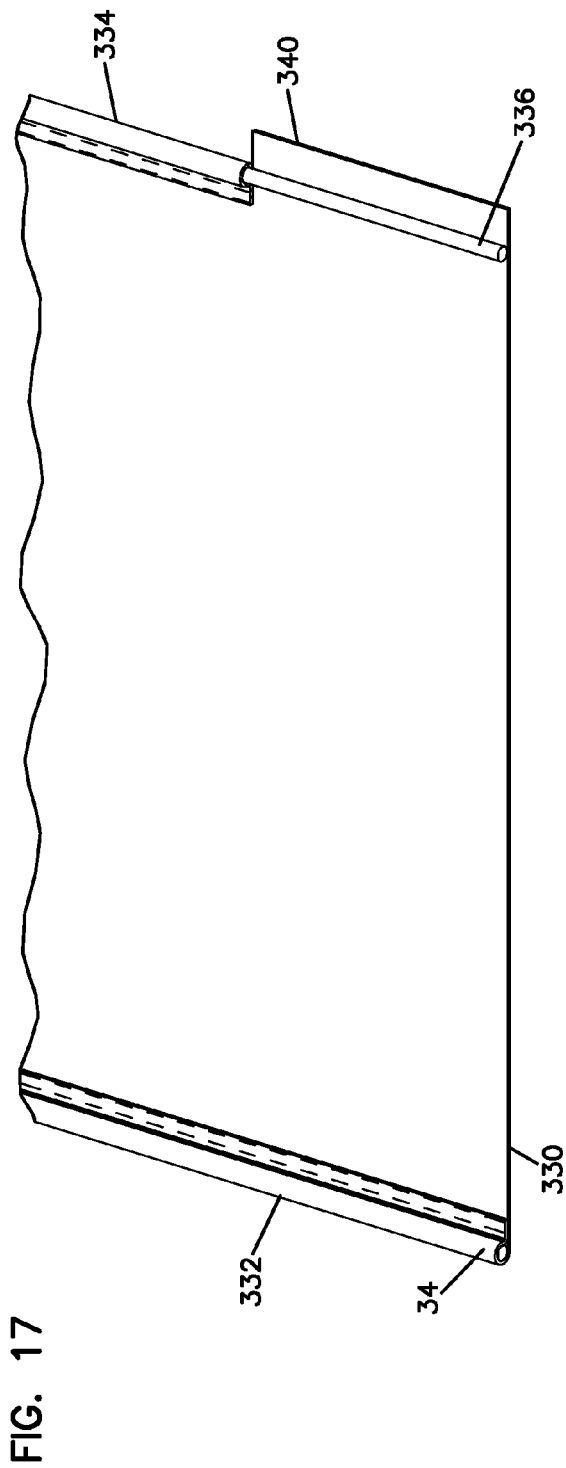
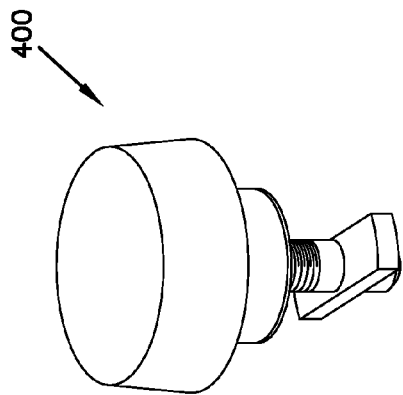
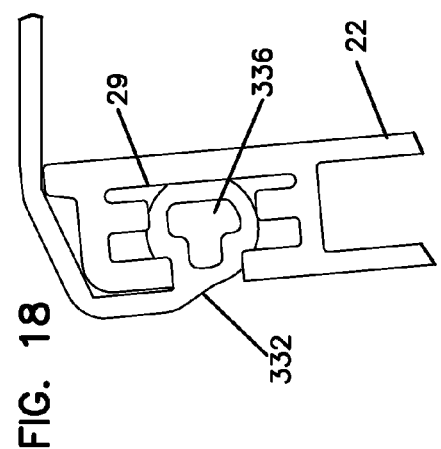

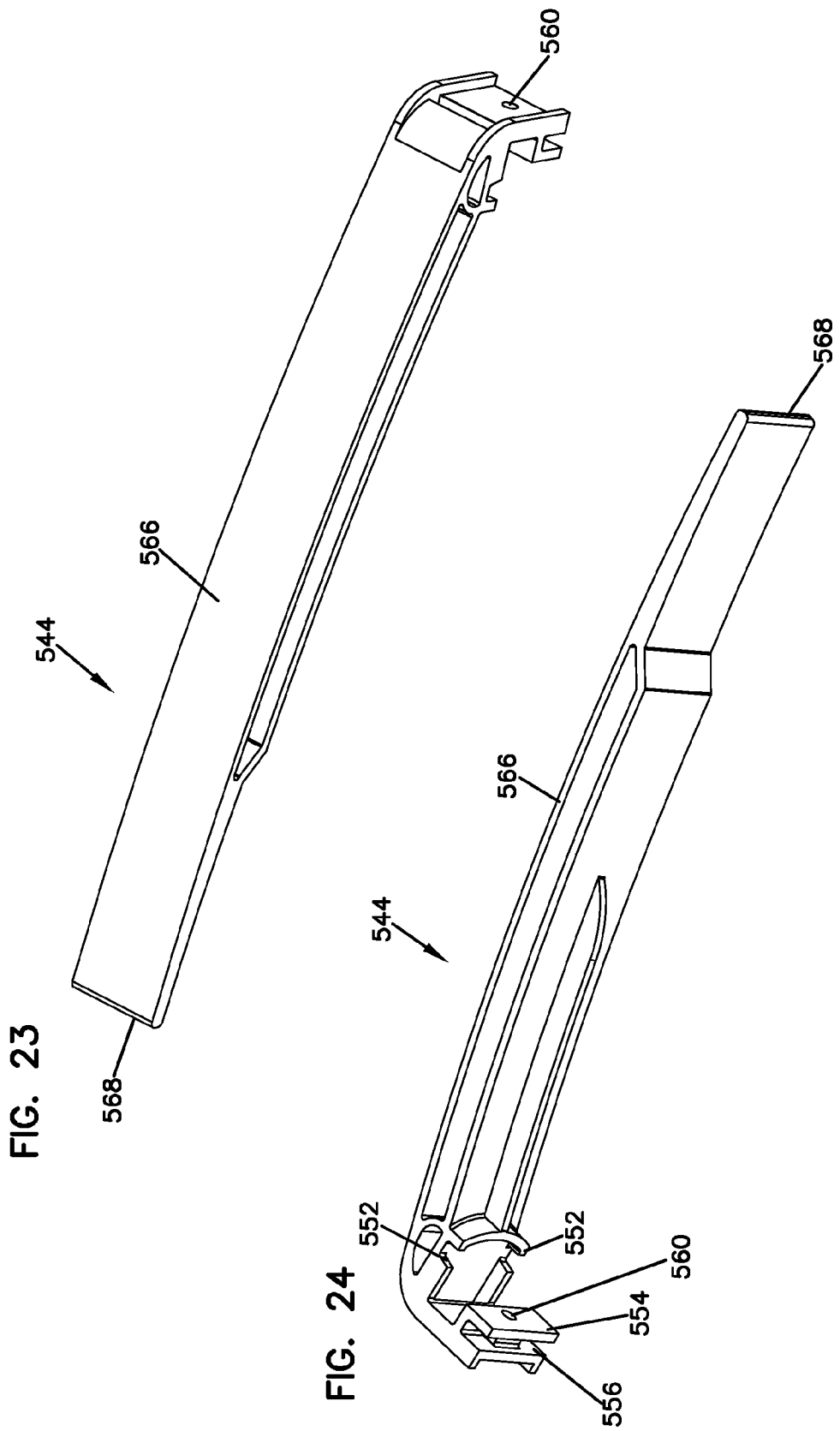

FLEXIBLE COVER FOR CABLE TROUGH SYSTEM

CROSS REFERENCE TO RELATED APPLICATION

This application claims the benefit of U.S. Provisional Patent Application Ser. No. 61/012,328, filed Dec. 7, 2007, and U.S. Provisional Patent Application Ser. No. 61/073,268, filed Jun. 17, 2008, which applications are hereby incorporated by reference in their entirety.

FIELD OF THE INVENTION

This application relates to a system for the management and routing of cables, such as telecommunications cables. More particularly, this invention pertains to troughs, fittings, and couplings for the system.

BACKGROUND OF THE INVENTION

In the telecommunications industry, the use of optical fibers for signal transmissions is accelerating. With the increased utilization of optical fiber systems, optical fiber cable management requires industry attention.

One area of optical fiber management that is necessary is the routing of optical fibers from one piece of equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another. Copper cables, hybrid cables or other transmission cables also need proper management and protection.

When routing optical fibers, it is desirable that a routing system will be easy to assemble, readily accessible and adaptable to changes in equipment needs. Accordingly, such routing systems include a plurality of trough members such as troughs and couplings for forming the cable routing paths. The trough system members are joined together by couplings. U.S. Pat. No. 5,067,678 to Henneberger et al dated Nov. 26, 1991 concerns a cable routing system that includes a plurality of troughs and fittings. The '678 patent further discloses a coupling (element 250 in FIG. 1 of the '678 patent) for joining trough members and fittings. With best reference to FIGS. 6-7 of the '678 patent, a plurality of hardware is disclosed for joining the trough members. U.S. Pat. Nos. 5,316,243; 5,752,781 and 6,715,719 show additional examples of couplings. U.S. Pat. No. 6,631,875 shows a cable trough system with various separate components joined together to assemble the system.

Various systems and methods are known for providing a cover over the trough members or other system components. U.S. Pat. Nos. 6,810,191; 6,835,891; 7,041,897 and 6,916,986 show various covers for positioning over trough members.

Several concerns arise with cable routing systems, including the ease of manufacture and installation of the troughs, couplings, and fittings, and the adequacy of the size of the system components to handle the number of cables in the system. Having enough space for the cables passing through the system is a particular concern as higher and higher densities are desired. There is a need for continued development of cable management systems.

SUMMARY OF THE INVENTION

A telecommunications cable system includes trough members including a cover system. Generally, a cover is coupled to the trough members to cover the trough members. The cover includes a flexible construction mounted across the top of the trough members. In one preferred embodiment, the cover is made from fabric. The cover and the trough member or members include a mounting arrangement to mount an edge of the cover to one or more trough members to secure the cover.

In accordance with one aspect, the cover includes eyelets located on the edge, and the trough members include posts, to secure the cover. Fasteners can be used to mount the eyelets to trough members. In another aspect, the cover includes a compressible rod located on the edge for receipt in a slot on the trough member to secure the cover.

In accordance with another aspect, the flexible cover mounts with a snap arrangement. Support ribs for the flexible cover are mounted to side walls of the trough member.

BRIEF DESCRIPTION OF THE DRAWINGS

FIG. 17 is a bottom view of the cover of FIG. 16 with portions shown disassembled.

FIG. 18 is an enlarged view showing an edge of the cover of FIGS. 16 and 17 mounted to a side wall of the trough member.

FIG. 19 shows an example fastener for mounting the cover to the trough member.

FIG. 23 is a perspective view of one of the support ribs.

FIG. 24 is a further perspective view of one of the support ribs.

DETAILED DESCRIPTION OF THE PREFERRED EMBODIMENT

Embodiments of the present invention are directed to covers for cable trough members. Generally, the covers can be coupled to the trough members to cover the trough members. In addition, the covers can be removed to provide access to the interior portions of the trough members. As used herein, the term "trough member" is used to refer to any trough, fitting, railway, raceway, or similarly configured component including any number of ends.

Figure 1:
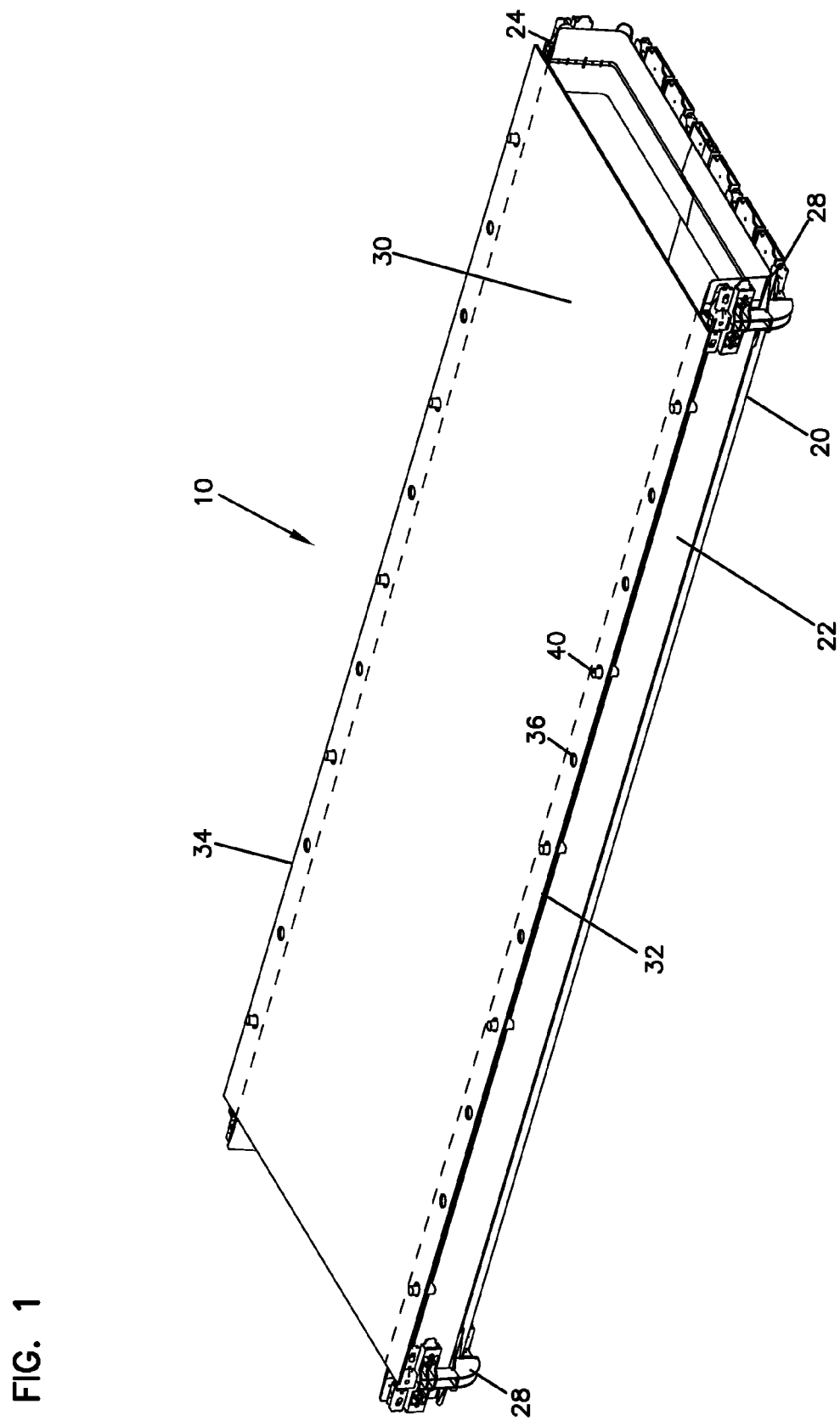
FIG. 1 is a perspective view of an embodiment of a trough system with a cover in a closed orientation and a lateral trough member made in accordance with the present invention.
Figure 2:
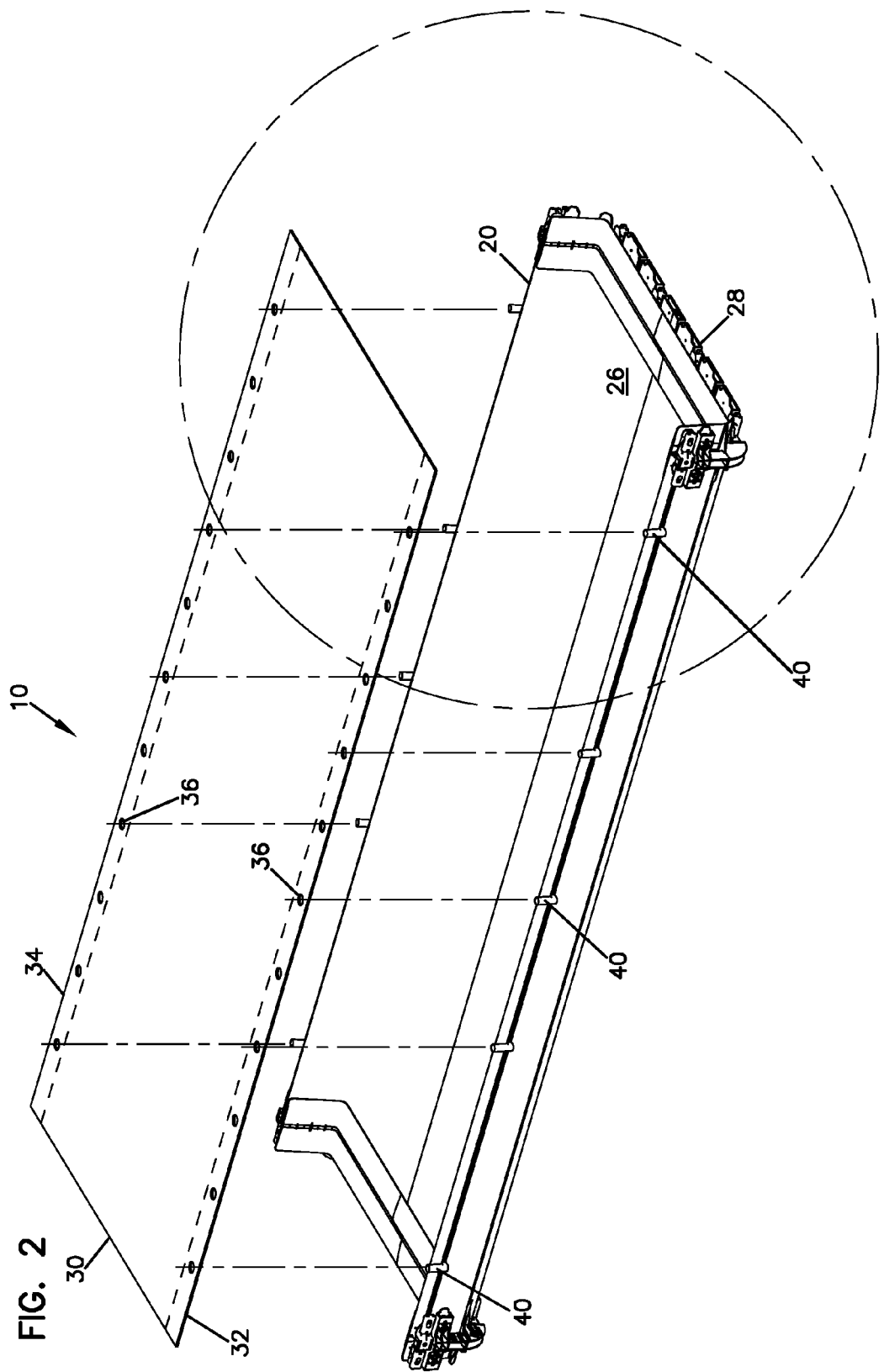
FIG. 2 is an exploded view of the trough system of FIG. 1, showing the cover separated from the lateral trough member.
Figure 3:
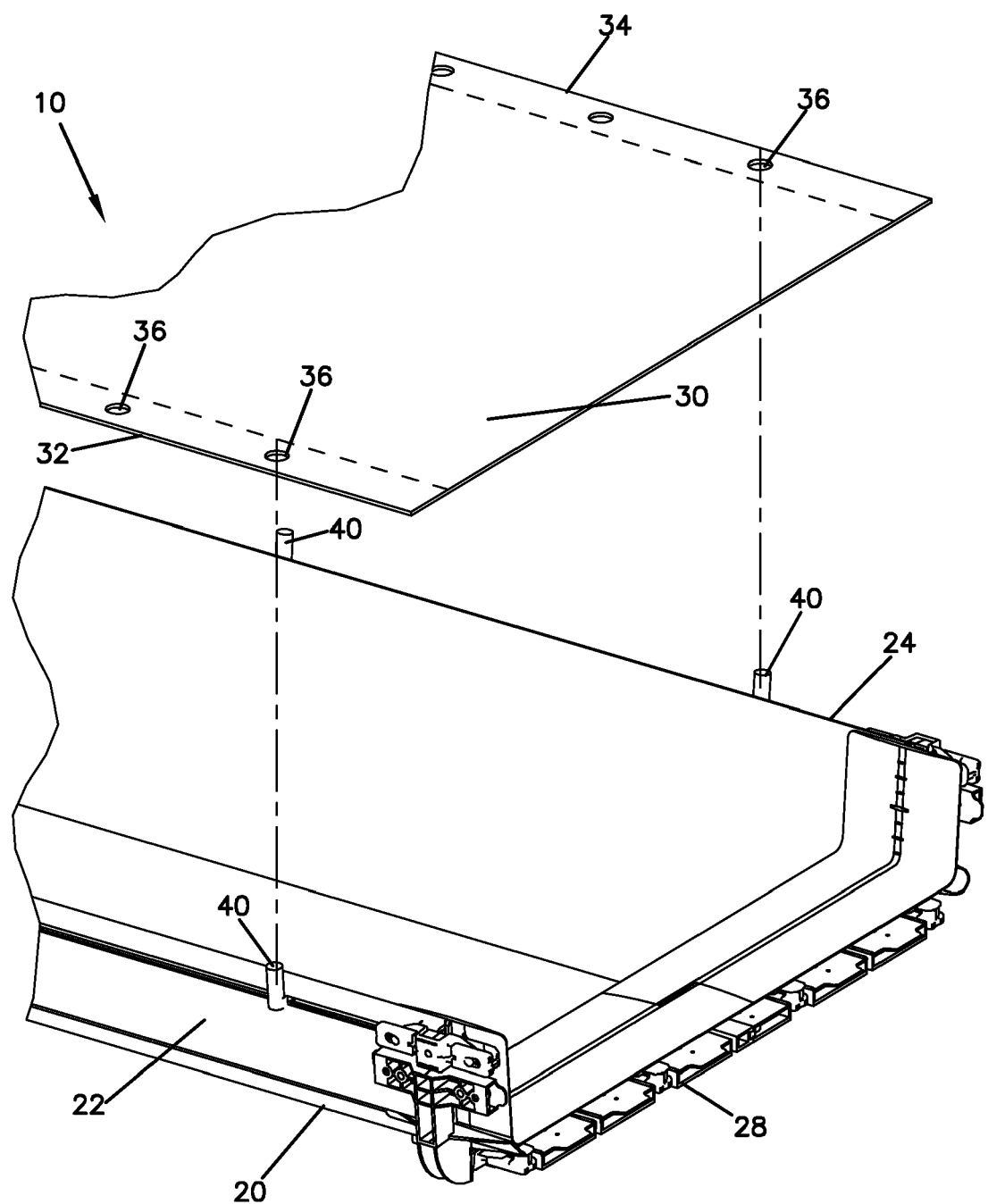
FIG. 3 is an enlarged view of a portion of the trough system of FIG. 2.

Referring now to FIGS. 1-3, an example embodiment of a cable trough system 10 is shown. System 10 generally includes a trough member 20 and a cover 30. Cover 30 is preferably made from a flexible material, such as fabric. In the illustrated embodiment, edges 32, 34 of cover 30 are coupled to trough member 20. In particular, edges 32, 34 are mounted to side walls 22, 24, respectively. Trough member 20 is a lateral trough element. Trough member 20 is typically coupled to other troughs or other cable management components for handling telecommunications cables. Coupling components 28 allow for coupling to other system members.

Edges 32, 34 of cover 30 include eyelets 36 which mount to posts 40 spaced along trough member 20. During use, eyelets 36 along one of edges 32, 34 can be lifted from posts 40 to provide access to an interior 26 of trough member 20.

Posts 40 can be separately mounted in desired locations to align with eyelets 36. Any number of posts 40 can be used. It is not necessary that all eyelets 36 be used with posts 40. Instead, only selected eyelets 36 can be used to couple cover 30 over trough member 20. Posts 40 can be mounted in slot 29 (see FIG. 18) and extend upward.

Figure 4:
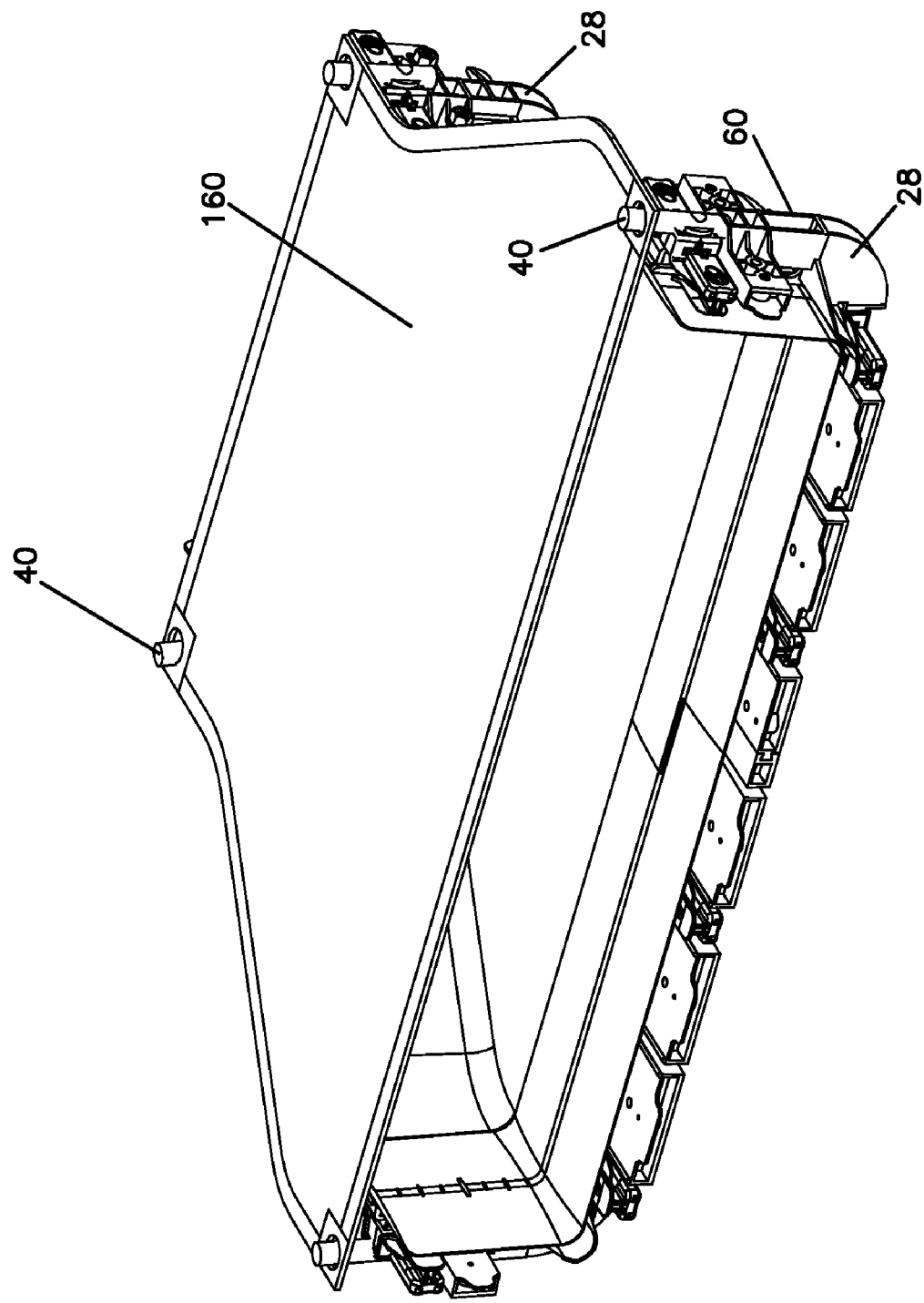
FIG. 4 is a perspective view of a further trough system including a cover and a reducer element.
Figure 5:
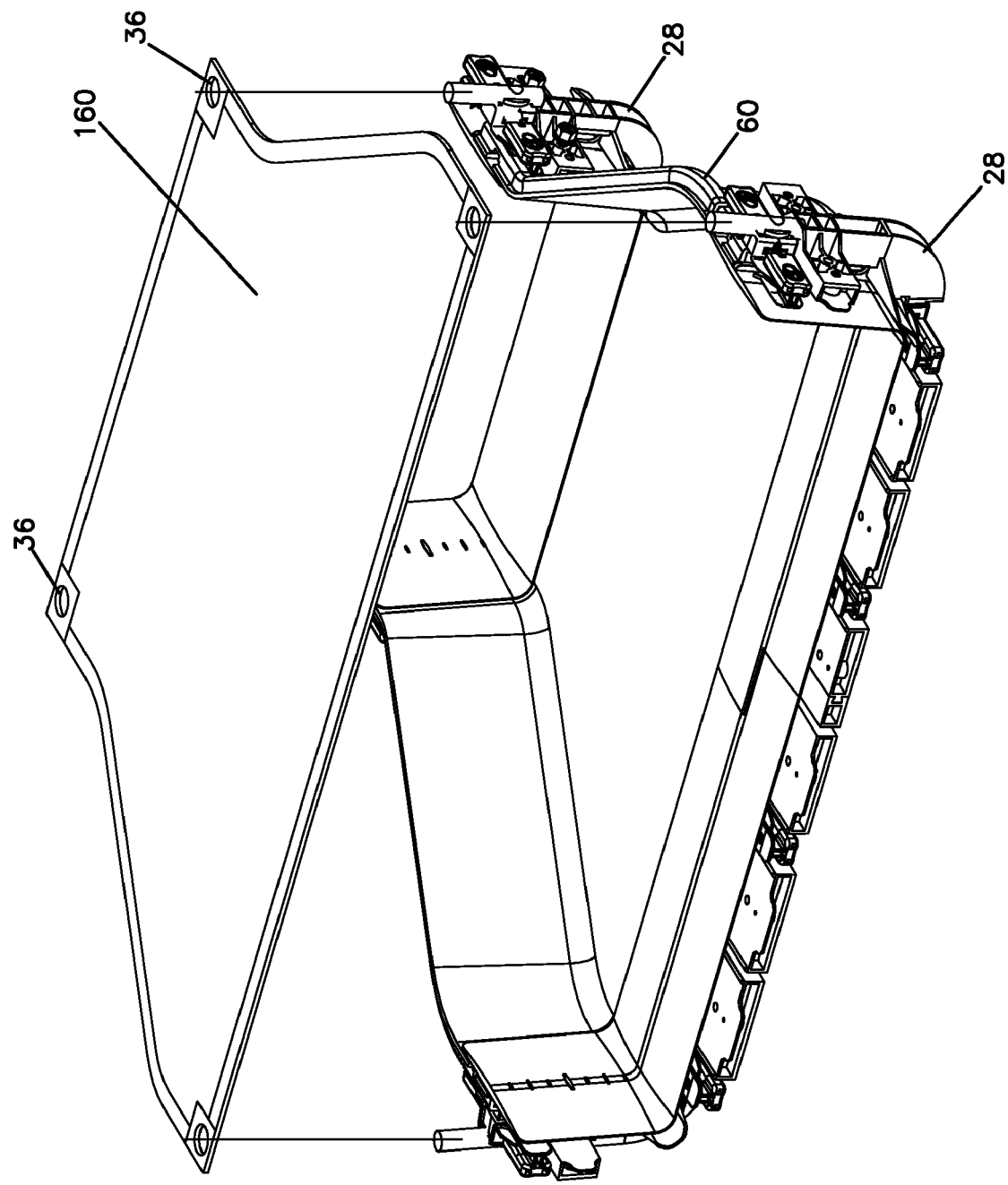
FIG. 5 is an exploded perspective view showing the cover separated from the reducer element in FIG. 4.

Referring now to FIGS. 4-15, various other trough members 60, 70, 80, 90, 100, 110 are shown. Each of trough members 60-110 include a different profile compared to trough member 20. A different cover 160, 170, 180, 190, 200, 210 sized for each trough member is provided so as to cover each respective trough member 60-110. As shown in FIGS. 4 and 5, trough member 60 is in the form of a 24 inch to 12 inch reducer element.

Figure 6:
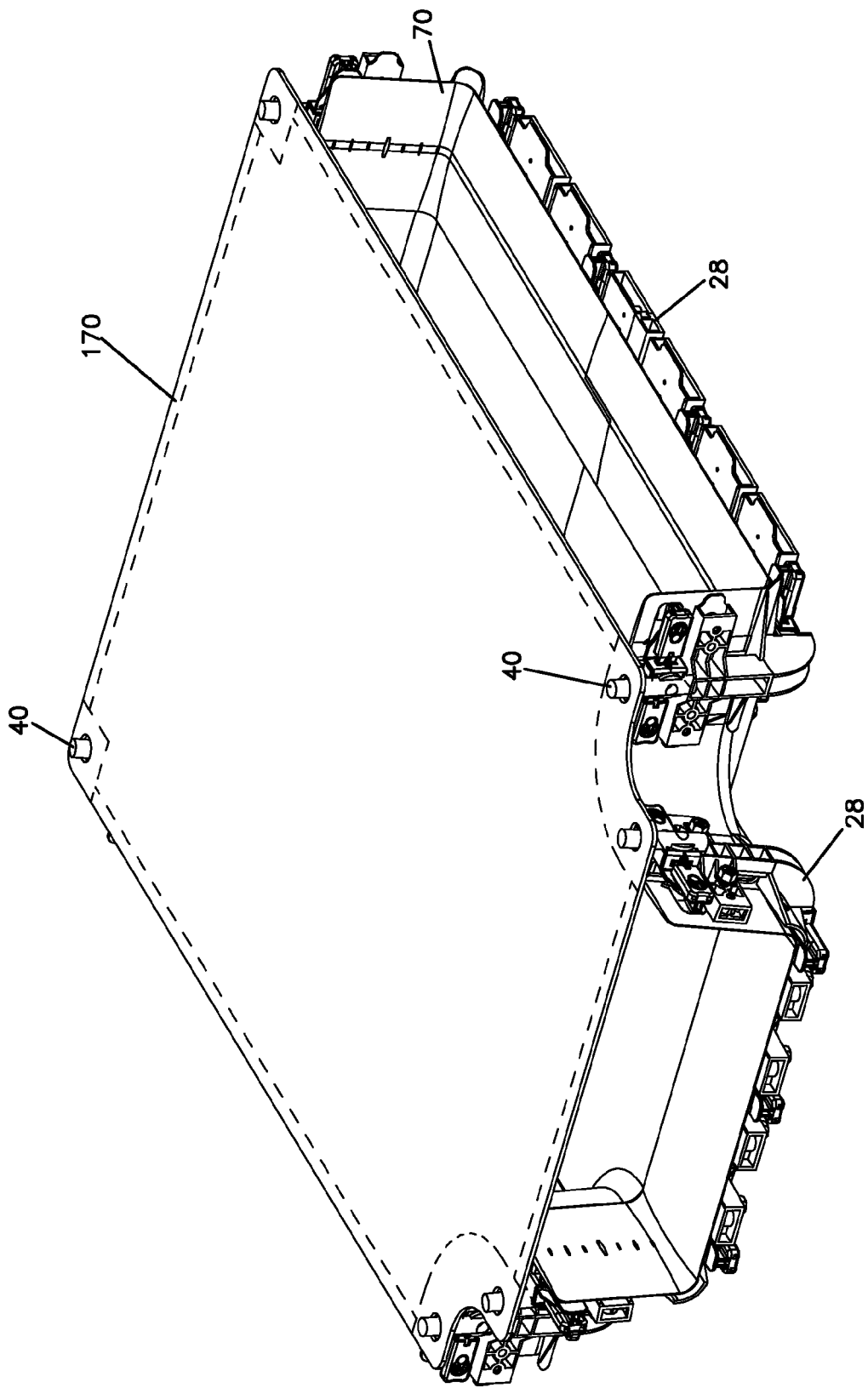
FIG. 6 is a perspective view of another trough system including a cover and a tee element.
Figure 7:
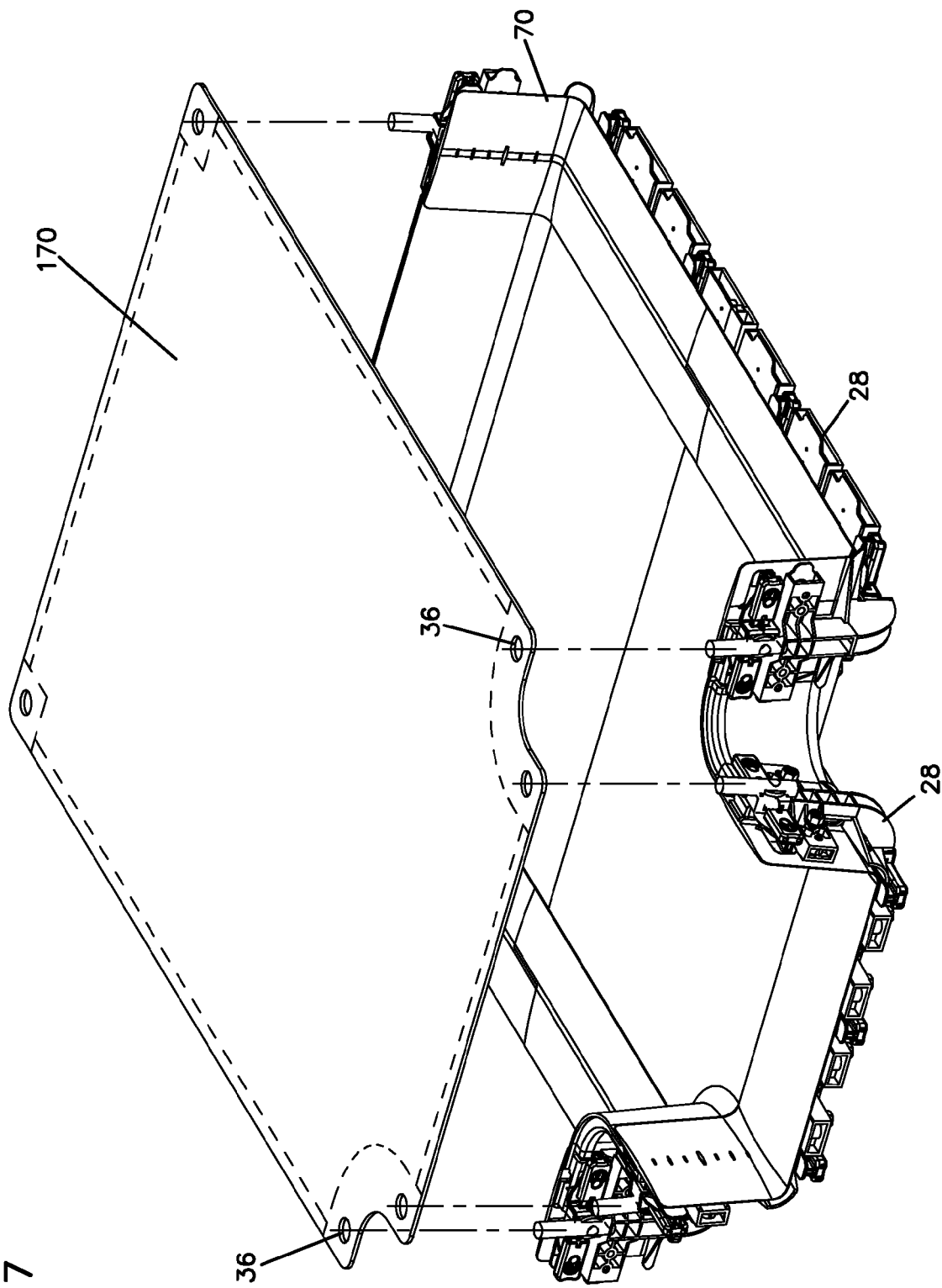
FIG. 7 is an exploded perspective view showing the cover separated from the tee element in FIG. 6.
Figure 8:
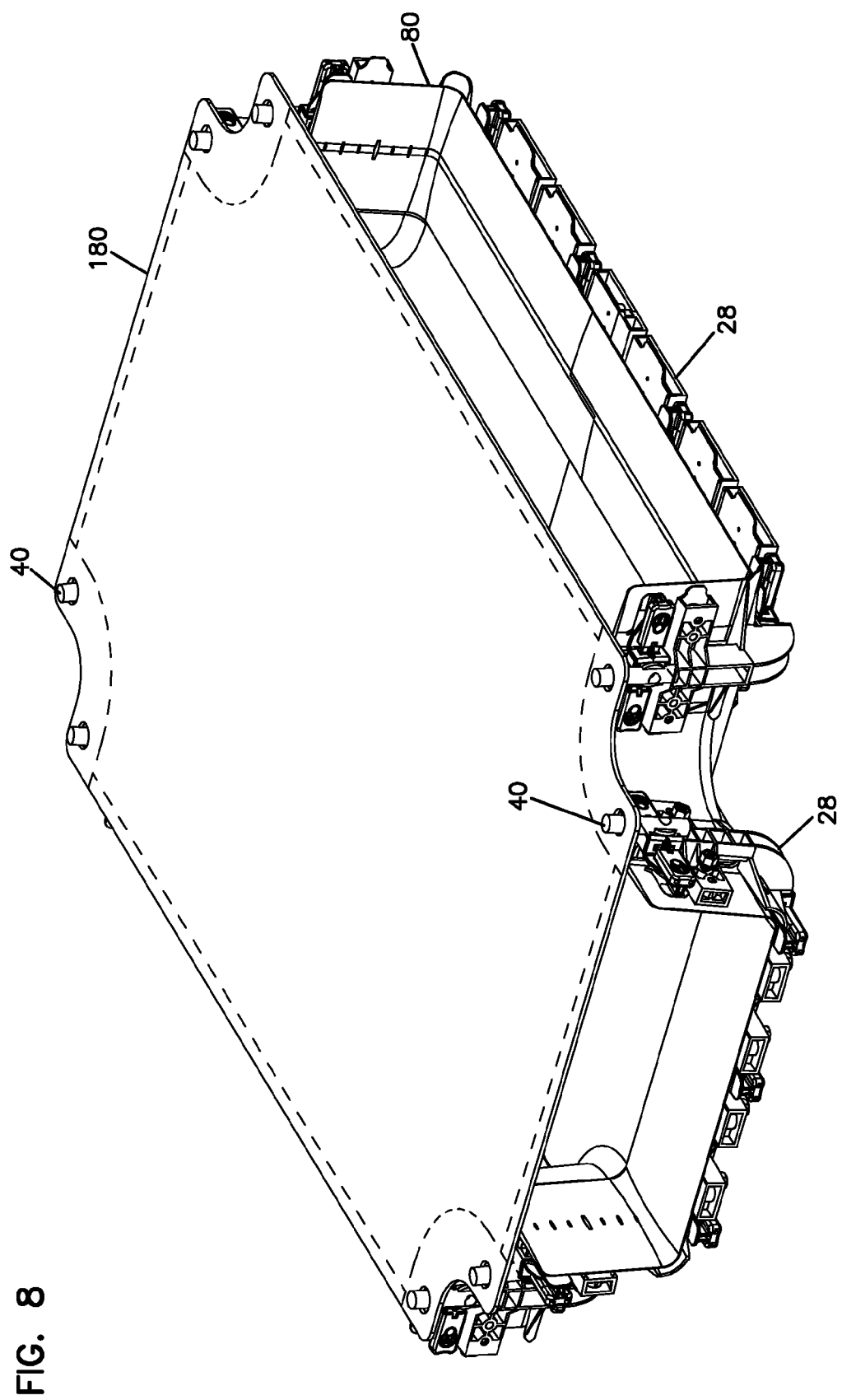
FIG. 8 is a perspective view of another trough system including a cover and a 24×12 inch cross element.
Figure 9:
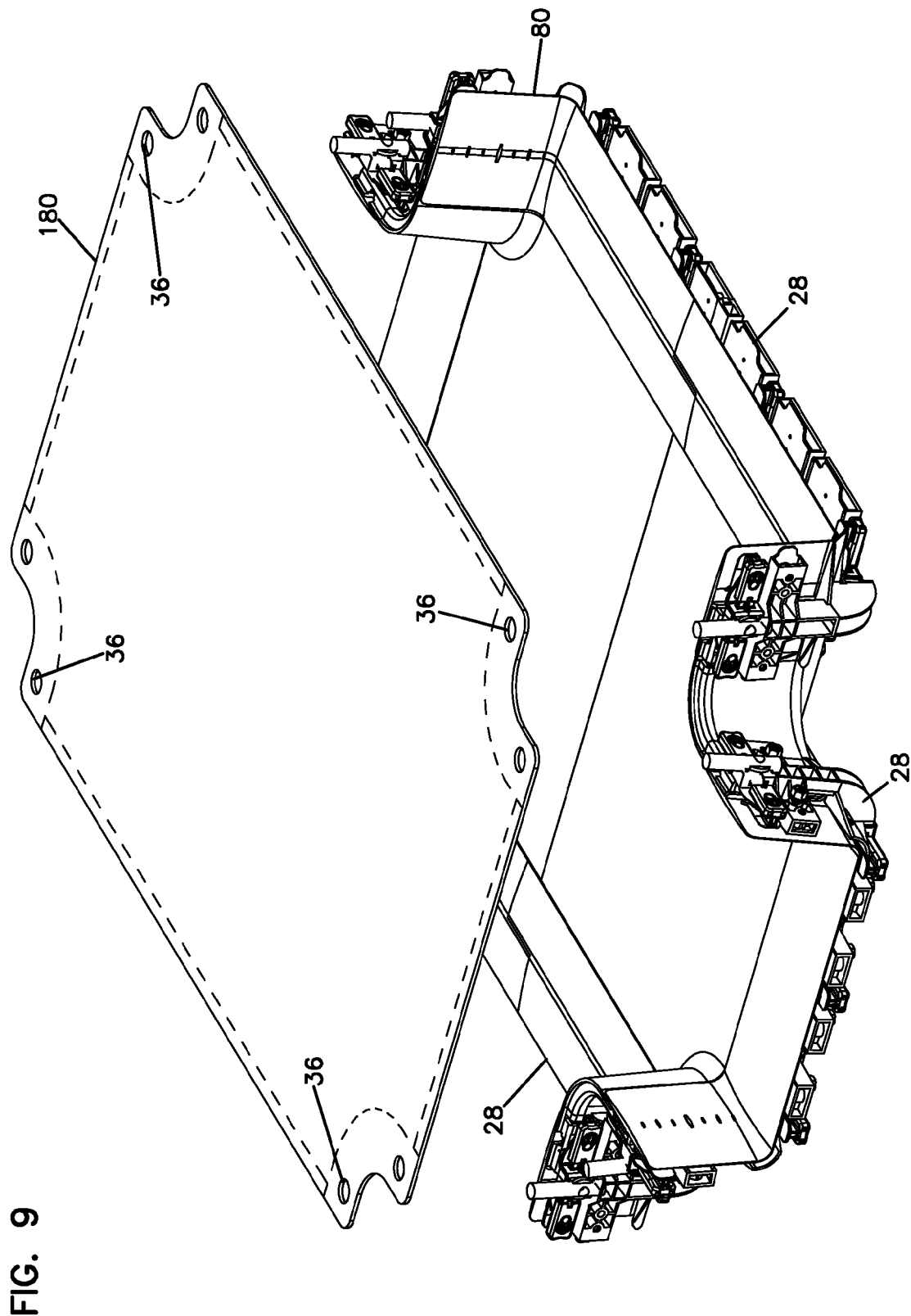
FIG. 9 is an exploded perspective view showing the cover separated from the cross element in FIG. 8.
Figure 10:
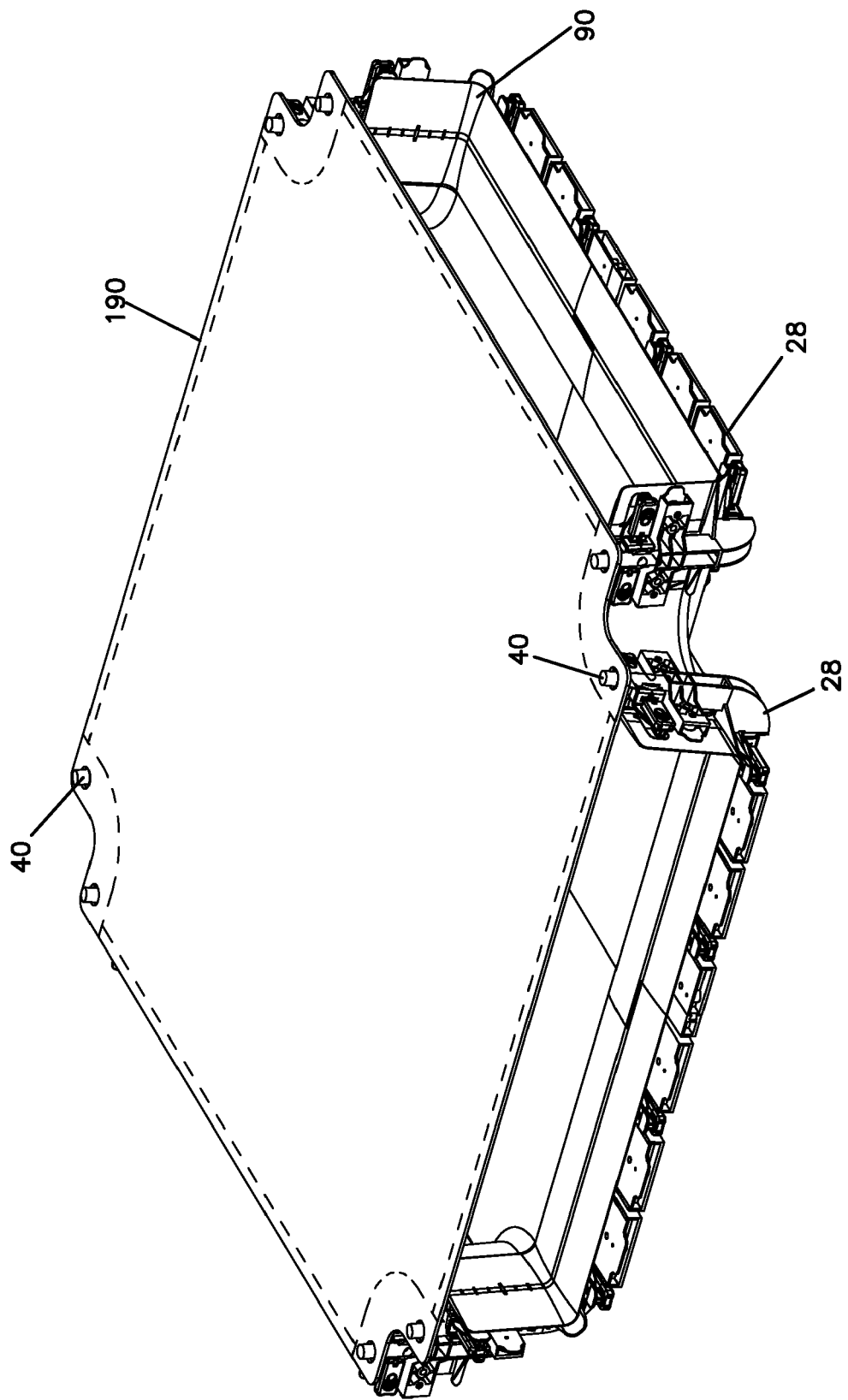
FIG. 10 is a perspective view of another trough system including a cover and a 24 inch cross element.
Figure 11:
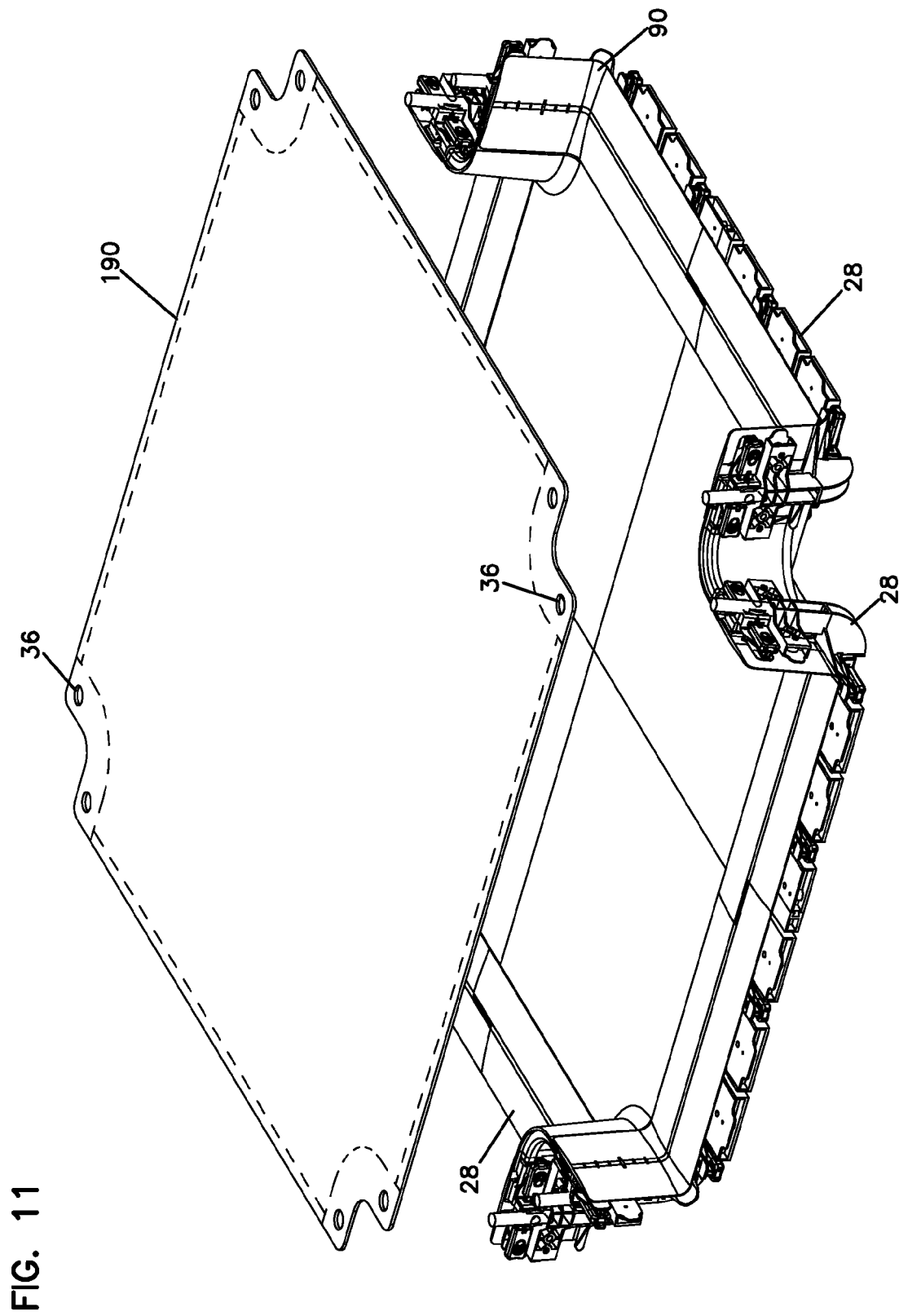
FIG. 11 is an exploded perspective view showing the cover separated from the cross element in FIG. 10.
Figure 12:
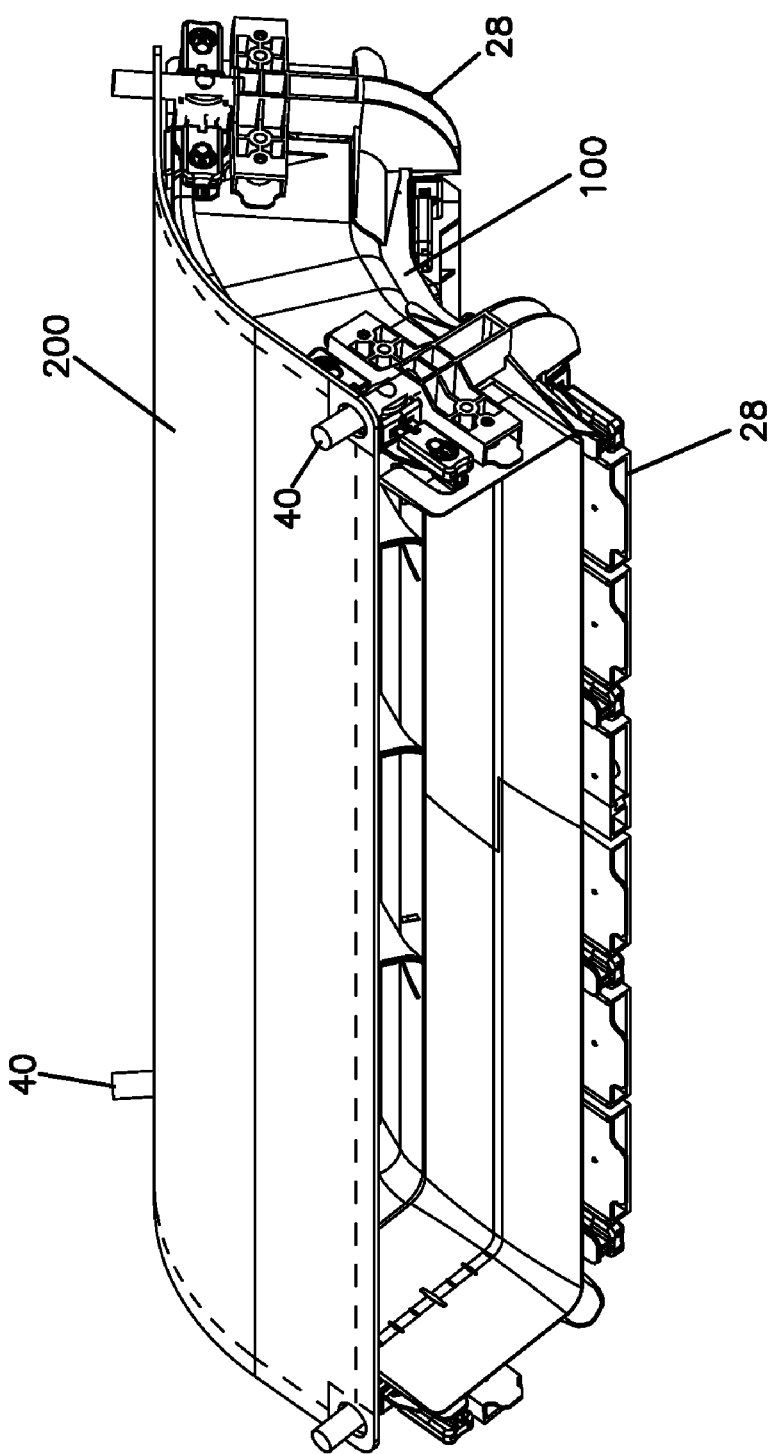
FIG. 12 is a perspective view of another trough system including a cover and a 45° down elbow element.
Figure 13:
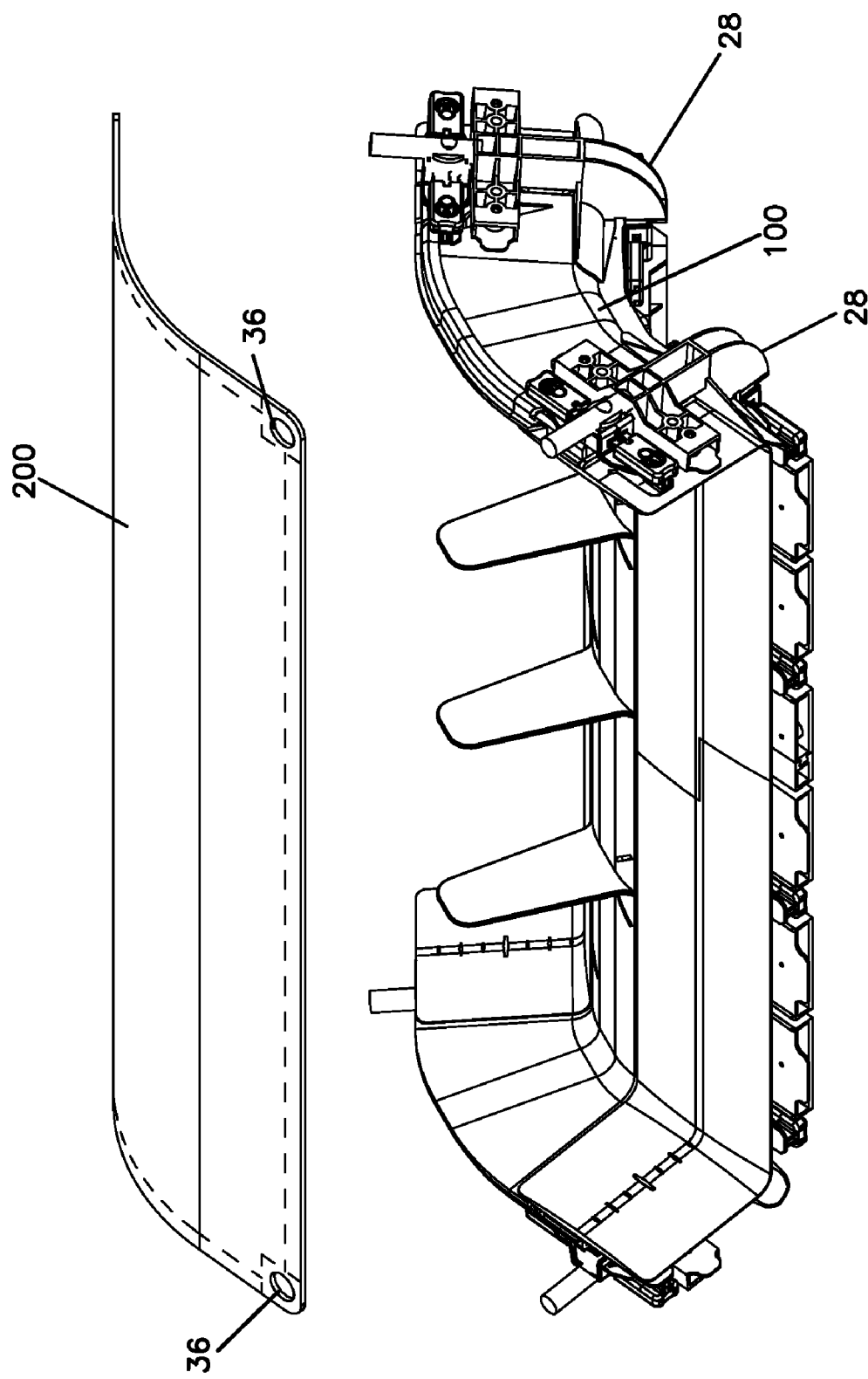
FIG. 13 is an exploded perspective view showing the cover separated from the elbow element in FIG. 12.
Figure 14:
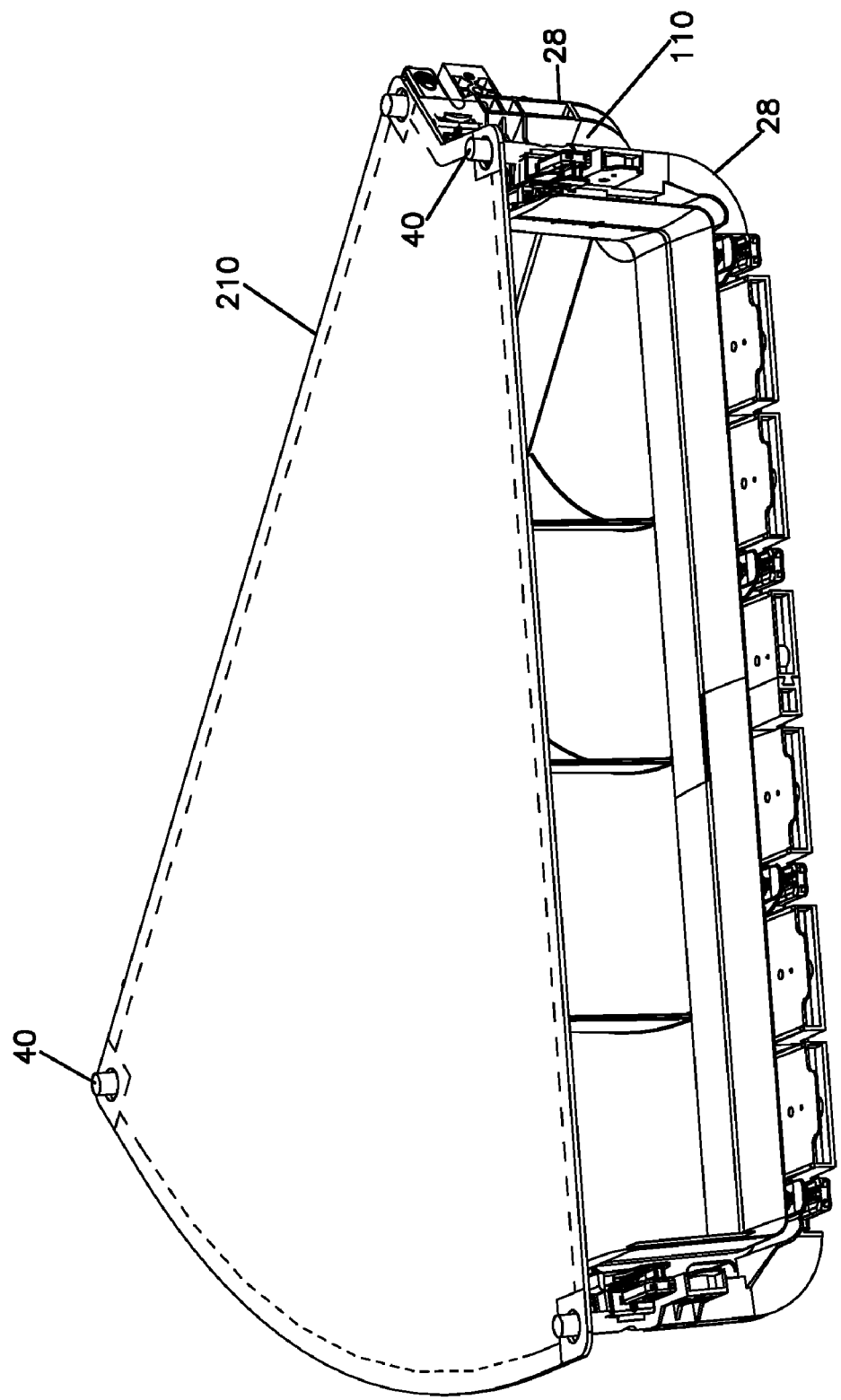
FIG. 14 is a perspective view of another trough system including a cover and a 45° horizontal elbow element.
Figure 15:
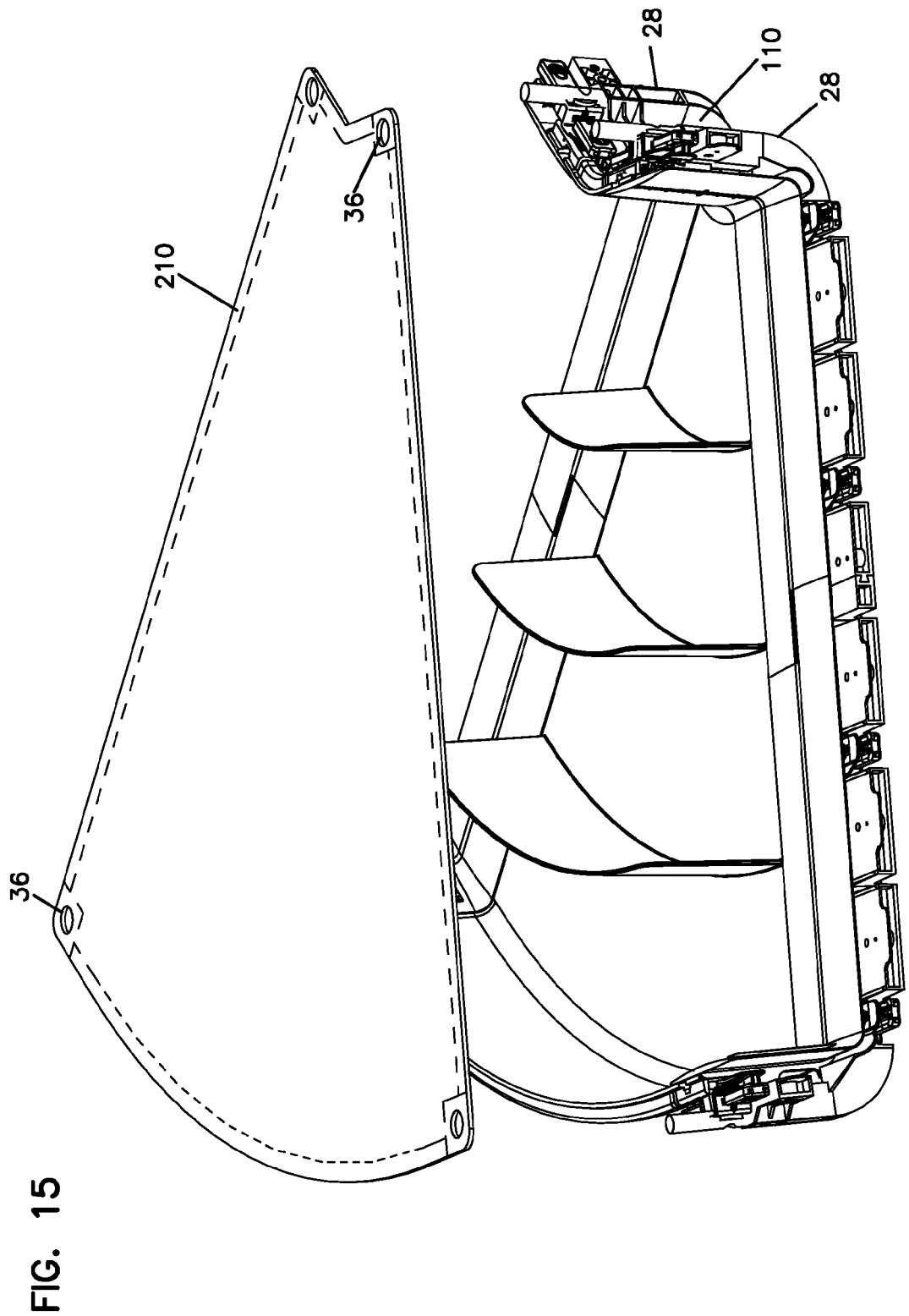
FIG. 15 is an exploded perspective view showing the cover separated from the elbow element in FIG. 14.

As shown in FIGS. 6 and 7, trough member 70 is in the form of a 24 to 12 inch tee element. As shown in FIGS. 8 and 9, trough member 80 is in the form of a 24 to 12 inch cross element. As shown in FIGS. 10 and 11, trough member 90 is in the form of a 24 inch cross element. As shown in FIGS. 12 and 13, trough member 100 is in the form of a 45° down elbow element. As shown in FIGS. 14 and 15, trough member 110 is in the form of a 45° horizontal elbow.

If desired, covers 30 and 160-210 can overlap in trough system 10. Such posts and eyelets 40, 36 can be utilized wherein an eyelet 36 from adjacent covers can share a common post 40. As shown in FIGS. 4-15, posts 40 are positioned on coupling components 28 for use in coupling each of the trough members to adjacent trough members.

Figure 16:
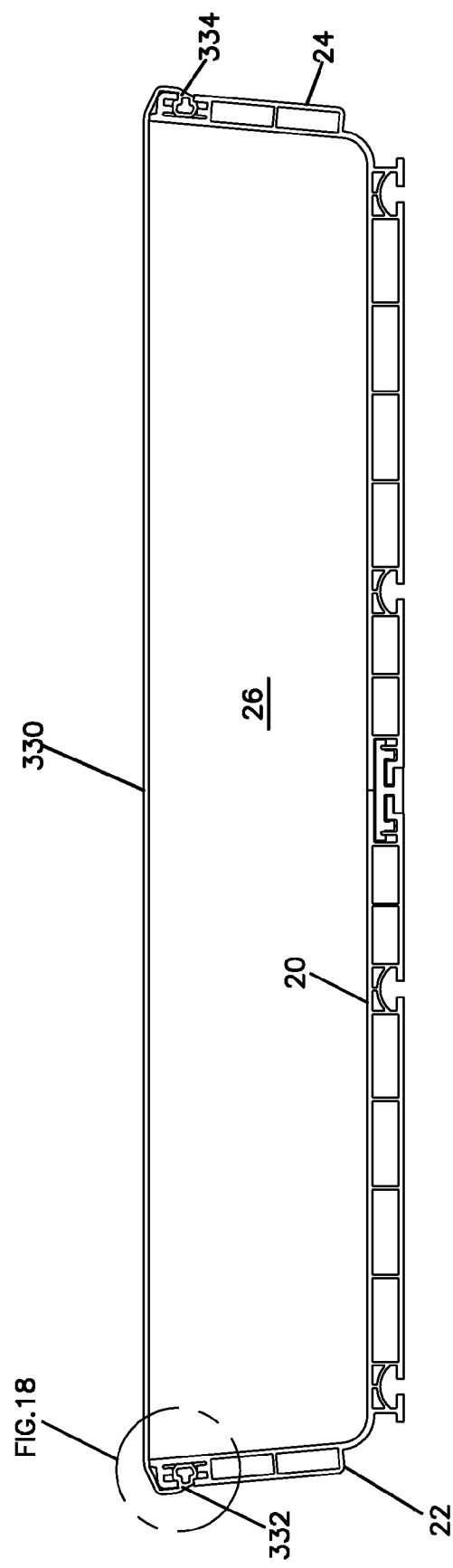
FIG. 16 is an end view showing an alternative embodiment of a trough system including a flexible cover with a different mounting arrangement.
Figure 20:
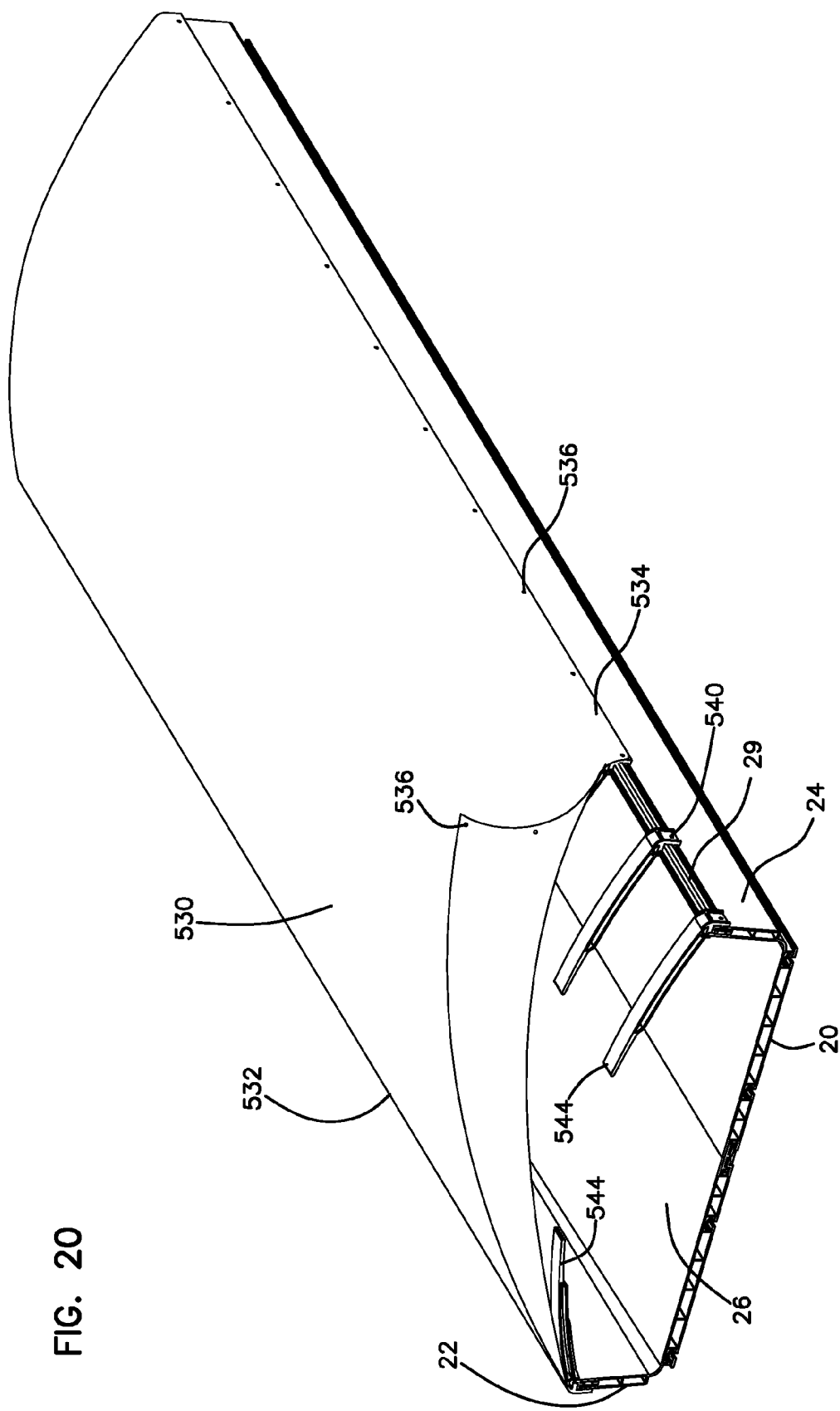
FIG. 20 is a perspective view of a further trough system including a cover mounted with snaps, and support ribs.
Figure 21:
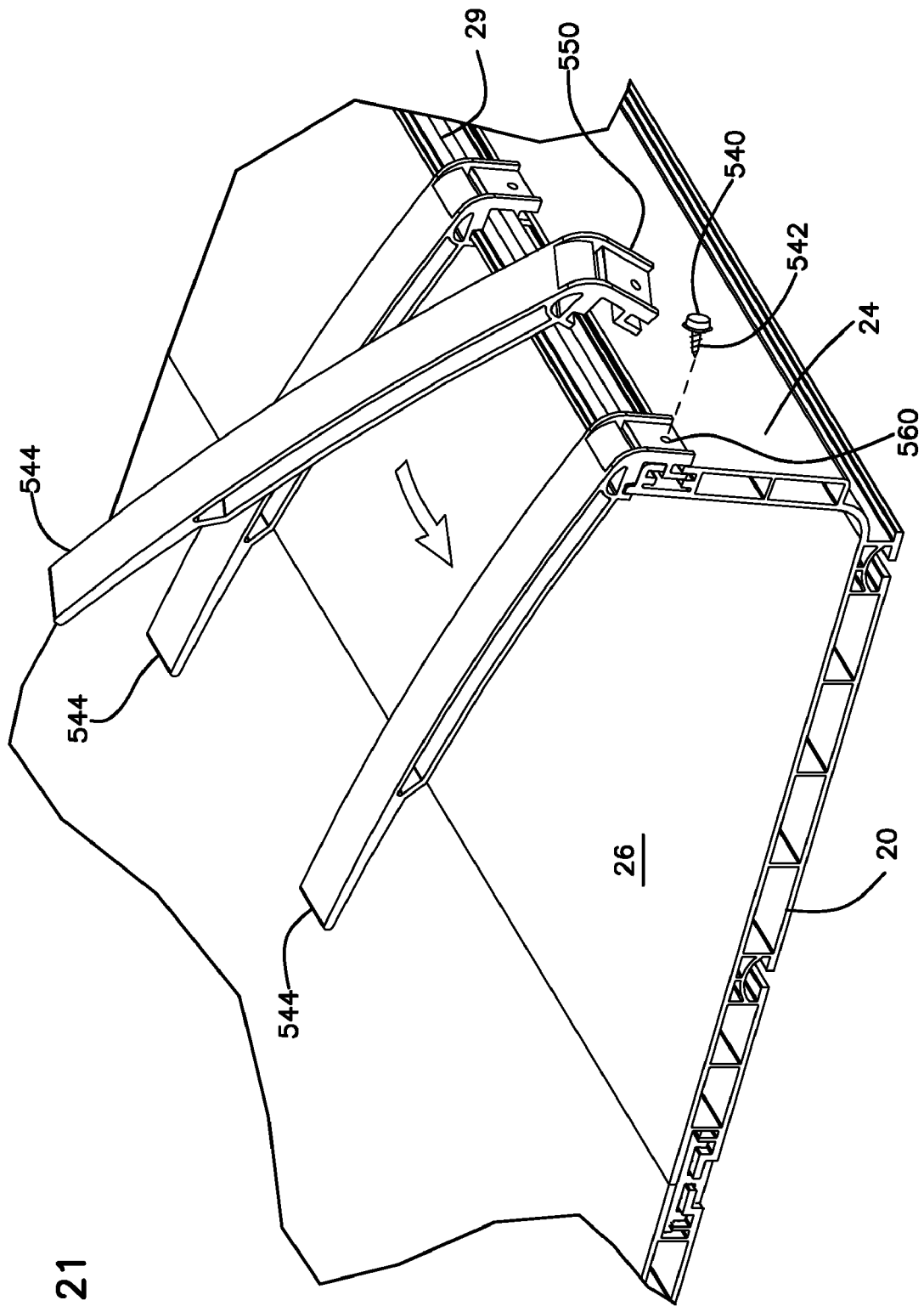
FIG. 21 is a perspective view showing the trough member and support ribs for the system of FIG. 20.
Figure 22:
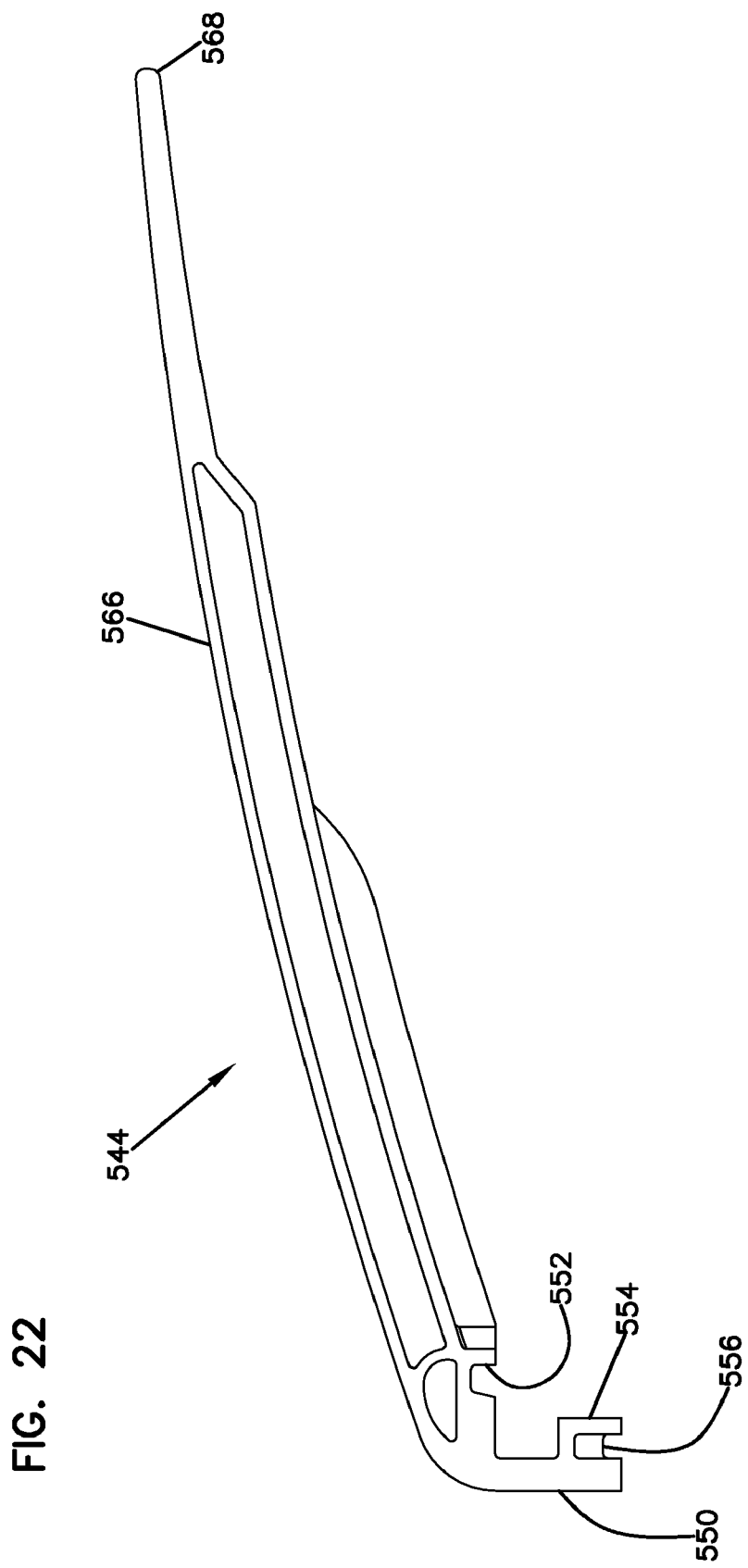
FIG. 22 is a side view of one of the support ribs.

Referring now to FIGS. 16-18, a further embodiment of a flexible cover 330 is shown. Cover 330 includes a rod-shaped element 336 positioned along each edge 332, 334. Each rod element 336 is stitched into a folded over portion 340 of cover 330. Edges 332, 334 including rod elements 336 form an enlarged compressible structure which is positioned in slot 29 of each side wall 22, 24 of trough member 20.

Two mounting arrangements are shown for mounting the edges of the various covers to the trough members. Other mounting arrangements include using fasteners, such as fastener 400 in FIG. 19, through eyelets 36 and held by slot 29. Another mounting arrangement can include hook and loop fastener portions.

During use, each cover 30 and 160-210 can be mounted to cover the interior of the trough members. As needed, one or more covers can be removed along one edge or all edges to expose the trough interior.

Referring now to FIGS. 20-24, a further embodiment of a flexible cover 530 is shown. Cover 530 includes edges 532, 534 including snaps 536. Trough member 20 is provided with a plurality of mating snaps 540 on each of side walls 22, 24. Mating snaps 540 are mounted on separate ribs 544 which are mounted to side walls 22, 24. In one preferred embodiment, mating snap 540 includes a screw tip 542 which can be driven into side walls 22, 24 to lock ribs 544 in place. Snaps 536 are releasable from mating snaps 540 to access interior 26 of trough member 20.

Ribs 544 help support flexible cover 530 to define trough interior 26 for holding cables. Each rib 544 includes a proximal end 550 which mounts to side walls 22, 24. In the illustrated embodiment, proximal end 550 includes a slot 552 and a tab 554 including a slot 556 for snap mounting to slot 29 of trough member 20. Once mounted to side walls 22, 24, each rib 544 can be longitudinally slid relative to slot 29. Screw 542 received in hole 560 allows for each rib 544 to be locked in place. Instead of snap mounting, each rib 544 can be mounted by sliding proximal end 550 longitudinally down slot 29 from an end of trough member 20. As shown, each rib 544 includes an elongated portion 566 terminating in a distal end 568 for supporting flexible cover 530. Ribs 544 and cover 530 are shown mounted on lateral trough member 20. Cover 530 can be modified and shaped for use on various other trough members, like trough members 60, 70, 80, 90, 100, 110 shown above. Similarly, ribs 544 can be mounted to trough members 60-110.

The various covers noted above are useful for accessing an interior of the trough member when limited space above the trough member is provided. For example, a rigid full cover that spanned the full width of a large trough (24 inch) may be difficult to remove or pivot in tight spaces.

The above specification and examples provide a complete description of the manufacture and use of the invention. Since many embodiments of the invention can be made without departing from the spirit and scope of the invention, the invention resides in the claims hereinafter appended.

What is claimed is:

1. A cable trough system, comprising:
   a trough member including first and second side walls extending from a bottom wall generally forming a trough;
   a cover assembly including:
   a flexible cover having opposed edges;
   a mounting arrangement for mounting the flexible cover to the trough member, wherein the opposed edges are mounted adjacent the respective first and second side walls, wherein an interior of the trough is covered by the flexible cover; and
   a plurality of elongated support ribs each having a proximal end slidably mounted to the side walls of the trough member and a free distal end extending over the bottom wall and spaced from the bottom wall.

2. The cable trough assembly of claim 1, wherein the mounting arrangement includes a plurality of snaps carried by the support ribs for snapping to the opposed edges of the flexible cover.

3. A cover assembly for covering a trough member having a base and opposing side walls, the assembly comprising:

a flexible cover having opposed edges and sized to cover the base and attach to the opposing side walls;
a plurality of snaps on opposite edges of the cover;
a plurality of elongated support ribs each having a proximal end slidably mountable to the side walls of the trough member and a free distal end, each rib including a mating snap.

4. A cable trough system, comprising:
a trough member including first and second side walls extending from a bottom wall generally forming a trough;
a cover assembly including:
a flexible cover made from fabric having opposed edges;
a plurality of snaps on opposite edges of the cover;
wherein the snaps are held by a mounting arrangement on the side walls of the trough member, the mounting arrangement including a plurality of elongated support ribs each having a proximal end slidably mounted to the side walls and a free distal end for supporting the flexible cover.

5. The cable trough system of claim 4, wherein the elongated support ribs are mounted spaced apart to each other on to the side walls of the trough member.

6. A method of covering a trough member having two side walls, the method comprising:
mounting spaced apart to each other on the side walls a plurality of elongated support ribs each having a proximal end slidably mounted to the side walls and a free distal end;
mounting a first edge of a flexible cover portion onto a first side wall of the trough member with a snap arrangement;
mounting a second edge of the flexible cover to an opposite side wall of the trough member with a snap arrangement.

7. The method of claim 6, wherein the support ribs snap mount to the side walls.

8. A cable trough system, comprising:
a plurality of separate trough members;
a cover assembly including:
a plurality of separate flexible covers;
a mounting arrangement for mounting each of the separate flexible covers to cover the trough members, the mounting arrangement including a plurality of elongated support ribs each having a free distal end for supporting one or more of the separate flexible covers.

9. A cable trough system, comprising:
a plurality of separate trough members interconnected with coupling components arranged on an exterior of each trough member to form a cable trough system;
a cover assembly including:
a plurality of separate flexible covers;
a mounting arrangement for mounting each of the separate flexible covers to cover an interior of the trough members, the mounting arrangement including a plurality of elongated support ribs each having a proximal end slidably mounted to side walls of the trough members and a free distal end for supporting the separate flexible covers.

10. A method of covering a trough member having two side walls, the method comprising:
providing a trough member and a plurality of elongated support ribs each having a free distal end mounted spaced apart to each other on the side walls of the trough member;
providing a flexible cover over a top of the trough member, wherein the flexible cover is secured to each of the two side walls along side edges and supported by the elongated support ribs;
releasing one of the side edges of the flexible cover from the trough member;
pulling back the flexible cover to expose a portion of an interior of the trough member, wherein the flexible cover is flexed to vary its shape.

11. The method of claim 10, wherein the trough member is about 24 inches wide between the two side walls.

* * * * *